US008799950B2

(12) United States Patent  (10) Patent No.: US 8,799,950 B2
Park et al.  (45) Date of Patent: Aug. 5, 2014

(54) APPARATUS AND METHOD FOR PROVIDING ADDITIONAL INFORMATION OF MEDIA CONTENT

(75) Inventors: Sung-Jin Park, Anyang-si (KR); Won-Sang Kwon, Seoul (KR); Jin-Guk Jeong, Yongin-si (KR); Yun-Je Oh, Yongin-si (KR); Joon-Woo Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1367 days.

(21) Appl. No.: 11/977,219

(22) Filed: Oct. 24, 2007

(65) Prior Publication Data
US 2008/0101773 A1 May 1, 2008

(30) Foreign Application Priority Data

Oct. 28, 2006 (KR) .................. 10-2006-0105368

(51) Int. Cl.
*H04N 5/445* (2011.01)
(52) U.S. Cl.
CPC ................ *H04N 5/44543* (2013.01)
USPC ............ 725/43; 725/37; 725/40; 386/239; 386/248
(58) Field of Classification Search
CPC ........ G11B 27/34; G11B 27/105; H04N 5/85; H04N 5/44543
USPC .......... 386/239, 248, 282, 243; 715/700, 772; 725/9, 37, 40-44, 47, 50
See application file for complete search history.

(56) References Cited

U.S. PATENT DOCUMENTS

| | | | |
|---|---|---|---|
| 6,262,724 B1* | 7/2001 | Crow et al. | 715/723 |
| 2002/0120925 A1* | 8/2002 | Logan | 725/9 |
| 2002/0180795 A1* | 12/2002 | Wright | 345/772 |
| 2003/0079224 A1* | 4/2003 | Komar et al. | 725/32 |
| 2003/0169303 A1* | 9/2003 | Islam et al. | 345/836 |
| 2004/0128317 A1* | 7/2004 | Sull et al. | 707/104.1 |

(Continued)

FOREIGN PATENT DOCUMENTS

EP 1513151 3/2005 .......... G11B 27/031

(Continued)

OTHER PUBLICATIONS

Nishikawa, Yuko, et al.; Patent Application Publication No. US 2006/0080716 A1; Publication Date: Apr. 13, 2006; "Method and Apparatus for Navigating Video Content."

Sai, Kairi, et al.; Patent Application Publication No. US 2002/0012526 A1; Publication Date: Jan. 31, 2002; "Digital Video Reproduction Method, Digital Video Reproducing . . . ."

Primary Examiner — Hung Dang
Assistant Examiner — Mishawn Dunn
(74) Attorney, Agent, or Firm — Cha & Reiter, LLC

(57) ABSTRACT

Provided are an apparatus and method for providing additional information of media content. In digital contents management, the apparatus for providing additional information of media content includes a media source, a media renderer, an additional information analyzer, a smart progress bar, and an additional information renderer. The media source receives media and additional information from a local file, a portable storage medium or a network and transfers the received media and additional information into the apparatus. The media renderer renders the received media to a user. The additional information analyzer analyzes the received additional information. The smart progress bar controls the playback of the media based on the analyzed additional information. The additional information renderer displays the additional information to the user by controlling the smart progress bar.

20 Claims, 6 Drawing Sheets

(56) References Cited

U.S. PATENT DOCUMENTS

2006/0044951 A1* 3/2006 Poslinski .................. 369/30.01
2006/0048184 A1* 3/2006 Poslinski et al. ................ 725/45
2006/0085812 A1* 4/2006 Shishegar et al. ............... 725/19
2011/0286721 A1* 11/2011 Craner .......................... 386/343

FOREIGN PATENT DOCUMENTS

| JP | 2001-197426 | 7/2001 | H04N 5/91 |
| JP | 2001-211408 | 8/2001 | H04N 5/76 |
| JP | 2004-072727 | 3/2004 | H04N 5/93 |
| JP | 2005-080027 | 3/2005 | H04N 5/91 |

* cited by examiner

APPARATUS AND METHOD FOR PROVIDING ADDITIONAL INFORMATION OF MEDIA CONTENT

CLAIM OF PRIORITY

This application claims the benefit of an earlier filed Korean Patent Application in the Korean Intellectual Property Office on Oct. 28, 2006 and assigned Serial No. 2006-105368, the disclosure of which is incorporated herein by reference in its entirety.

BACKGROUND OF THE INVENTION

1. Field of the Invention

The present invention relates generally to an apparatus and method for providing additional information of media content, by which characteristic features of media content can be maximally represented by setting additional information related to the media content to be displayed at a time desired by a user.

2. Description of the Related Art

In general, a contents system displays media content transmitted from broadcasting stations or contents providing servers on a screen when selected by a user. Along with the development of multimedia technology, the transition from analog contents systems to digital contents systems is currently ongoing.

Recent advances in ultrahigh-speed Internet technology have led to a tremendous growth of digital contents industry in various fields, such as movies, games, music, or e-books. The $21^{st}$ century is an era that sees the dominance of the IT software industry including contents over the hardware industry and will promisingly be a wealth-creating era. Such digital contents industry collectively refers to the industry associated with production, processing, protection, distribution and servicing of information via communication networks, digital broadcasting networks, and digital storage media. If the ultrahigh-speed Internet infrastructure of Korea is tied up with its advanced contents producibility in various fields, the nation's IT industry will develop to a higher level and the thus produced contents will become the nation's higher value-added exports.

In particular, with the rapid development of multimedia signal processing and transmission technologies and the emergence of new mobile TV services, such as Digital Video Broadcasting-Handheld (DVD-H) or Digital Multimedia Broadcasting (DMB), the popularity of viewing video through small-sized LCD panels is gradually growing in Korea.

In such digital content systems, a large-capacity media program can be stored in a hard disc and can be played back and viewed at any time when a user desires to view the program.

Media provide means by which information is stored, and there are a variety of types of media, including a flash memory, a hard disc drive (HDD), a compact disc (CD), a compact disc rewritable (CD-RW), and so on, according to the kind of media player used. With the advent of a multimedia age, the media have come to provide diversified contents.

In the prior art, however, additional information related to the content stored in the media is merely simple information, such as track information regarding the content currently being played back or playback time information. Furthermore, the prior art media still cannot be used for file searching or navigation.

Accordingly, what is needed is technology of utilizing additional information related to content in various ways, for example, compiling or searching for the additional information, at a time desired by a user.

SUMMARY OF THE INVENTION

The present invention is provides an apparatus and method for providing additional information about media content by which characteristic features of media content can be maximally represented by setting additional information related to the media content to be displayed at a desired time by a user.

The present invention provides an exemplary embodiment of an apparatus for providing additional information of media content in digital contents management, the apparatus including a media source receiving media and additional information from at least one of a local file, a portable storage medium and a network and transferring the received media and additional information into the apparatus, a media renderer rendering the received media to a user, an additional information analyzer analyzing the received additional information, a smart progress bar controlling the playback of the media based on the analyzed additional information, and an additional information renderer displaying the additional information to the user by controlling the smart progress bar.

According to another exemplary embodiment of the present invention, there is provided a method for providing additional information of media content in digital contents management, the method including receiving media and additional information from at least one of a local file, a portable storage medium and a network and transferring the received media and additional information into the apparatus, analyzing the received additional information, setting the analyzed received additional information to be at least one of displayed all the time and to be selectively displayed according to a user setting, defaulting a playback indicator for display of the additional information and continuously performing the steps of (a) playing back the media, (b) changing a state of the playback indicator based on the additional information, (c) displaying an index of the additional information and a preview pop-up area, and (d) playing back a preview pop-up in accordance with a movement of the playback indicator.

BRIEF DESCRIPTION OF THE DRAWINGS

The above features and advantages of the present invention will become more apparent from the following detailed description when taken in conjunction with the accompanying drawings in which.

DETAILED DESCRIPTION

Figure 1:
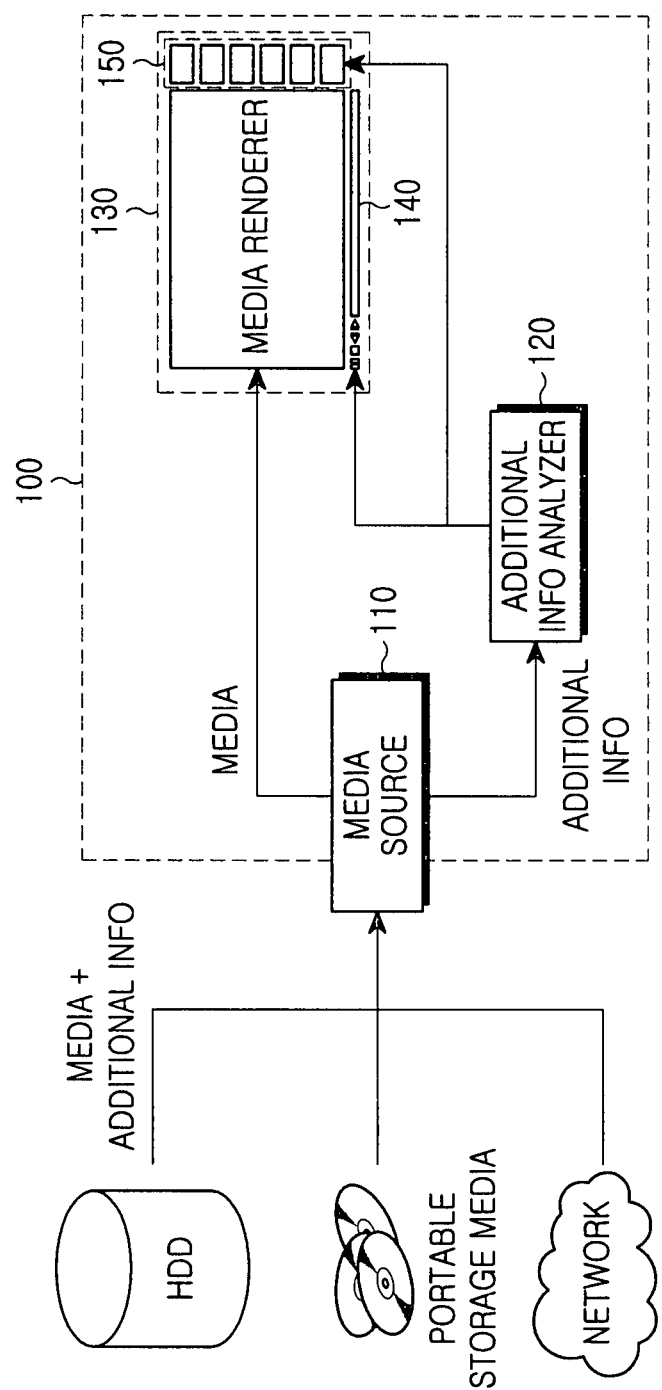
FIG. 1 illustrates a schematic diagram of a structure of an apparatus for providing additional information of media content according to an exemplary embodiment of the present invention.

Exemplary embodiments of the present invention will now be described in detail with reference to the annexed drawings. In the drawings, the same or similar elements are denoted by the same reference numerals even though they are depicted in different drawings. For the purposes of clarity and simplicity, a detailed description of known functions and configurations incorporated herein has been omitted for clarity and conciseness.

Figure 2:
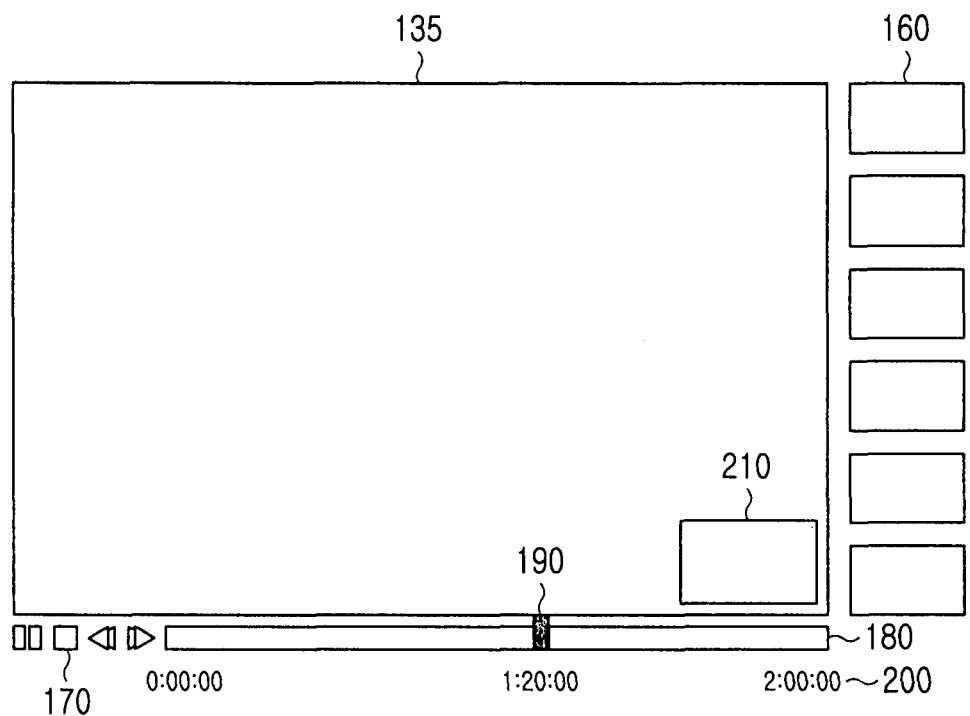
FIG. 2 illustrates a schematic diagram of a structure of a media renderer according to an exemplary embodiment of the present invention.

FIG. 1 illustrates a schematic diagram of a structure of an apparatus for providing additional information of media content according to an exemplary embodiment of the present invention, and FIG. 2 illustrates a schematic diagram of a structure of a media renderer according to an exemplary embodiment of the present invention.

As shown in FIGS. 1 and 2, the apparatus 100 for providing additional information of media content according to an exemplary embodiment of the present invention includes a media source 110, an additional information analyzer 120, a media renderer 130, a smart progress bar 140, and an additional information renderer 150.

The media source 110 receives media and additional information from at least one of a local file stored in a hard disk drive (HDD), a portable storage medium, and a network, and transfers the received media and additional information into the apparatus 100.

The additional information analyzer 120 analyzes the additional information received from the media source 110, said additional information including chapter information, highlighted information, representative images, summaries, etc.

The media renderer 130 renders the media received from the media source 110 to a user via a media renderer window 135.

The smart progress bar 140 controls the playback of the media using the additional information analyzed by the additional information analyzer 120 in various ways.

The additional information renderer 150 displays the additional information analyzed by the additional information analyzer 120 in at least one additional information renderer window 160 in an appropriate form, as shown in FIG. 2.

The smart progress bar 140 may comprise a playback control button 170, a progress bar 180, a playback indicator 190, and a time mark 200. The playback control button 170 controls the playback of media and is used to display the additional information. The progress bar 180 displays an index of the additional information. The playback indicator 190 indicates a current playback time of the media and is used to move a media playback time to a time desired by a user. The time mark 200 is configured to indicate a start time and an end time of media, and a current playback time.

Figure 3:
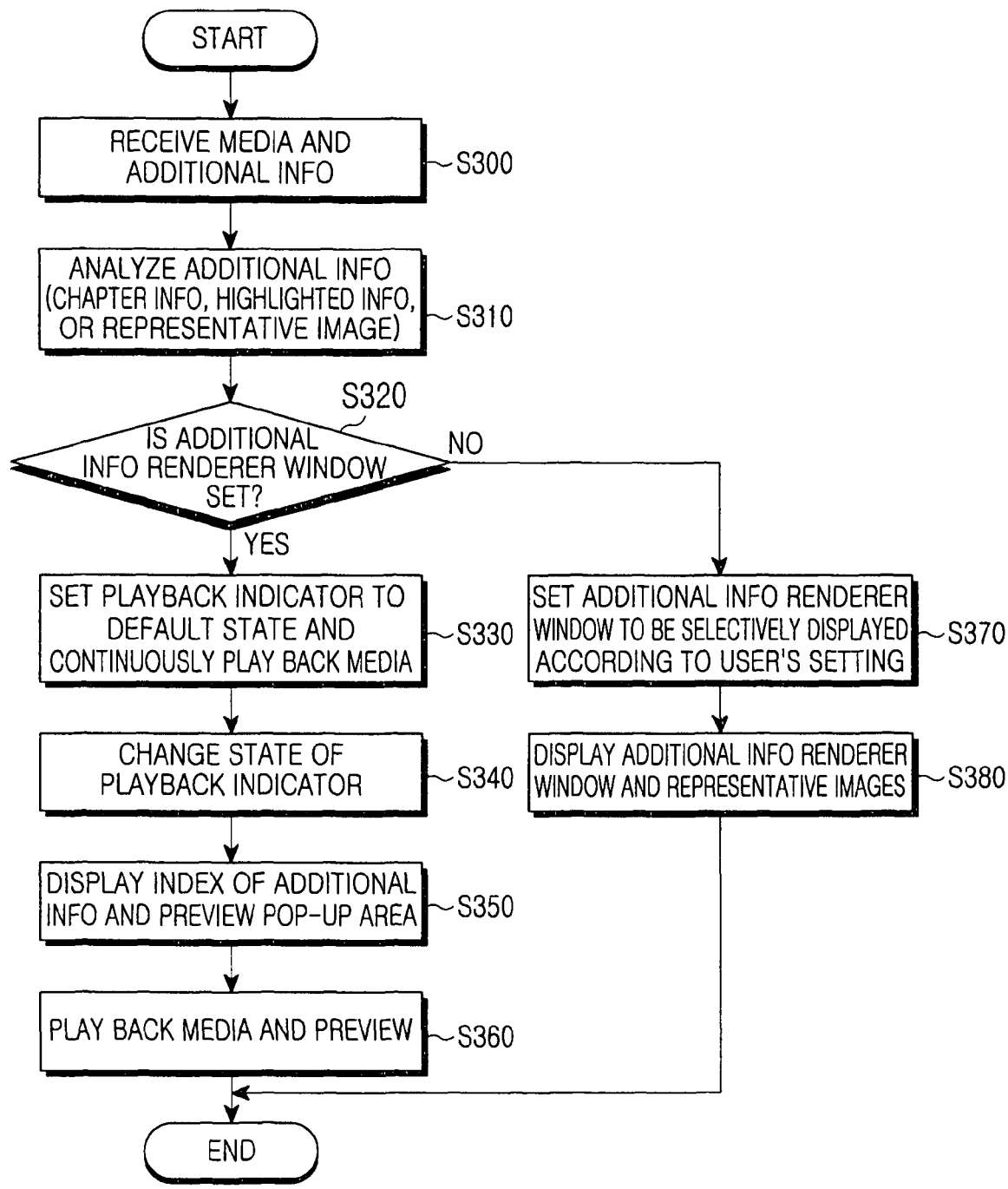
FIG. 3 illustrates a flowchart of a method for providing additional information of media content according to an exemplary embodiment of the present.

FIG. 3 illustrates a flowchart of a method for providing additional information of media contents, according to an exemplary embodiment of the present invention.

In step S300, the media source 110 of the apparatus 100, according to the present invention, reads media and additional information from a local file stored in at least one of a HDD, a portable storage medium, such as an external memory, CD and DVD, and a media server connected to a network. The media read from the media source 110 is transferred to the media renderer 130 and the additional information is transferred to the additional information analyzer 120.

The media renderer 130 renders the media transferred from the media source 110 to a user in an audio or video format by means of a common media decoder for viewing by a user. In step S310, the additional information is analyzed by the additional information analyzer 120. Here, the example additional information, which is associated with a media index (e.g., byte counts or time), includes chapter information, highlighted information, and so on.

The additional information analyzed by the additional information analyzer 120 is displayed for viewing by a user. Some of the additional information is displayed on a smart progress bar 140 externally provided with respect to the media renderer 130, and some other information is displayed in the additional information renderer window 160, which is also externally provided with respect to the media renderer window 135, like the smart progress bar 140, as shown in FIG. 2. In step S320, the user may set the additional information renderer window 160 to be displayed all the time or to be selectively displayed according to a setting by the user.

Figure 4:
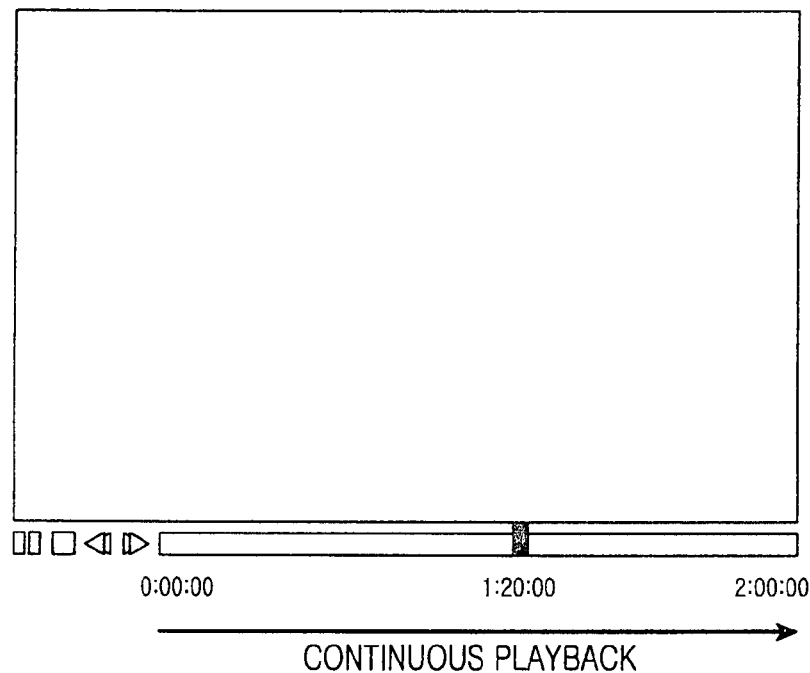
FIG. 4 illustrates a diagram of a default state of the apparatus for providing additional information of media content according to an exemplary embodiment of the present invention.
Figure 5:
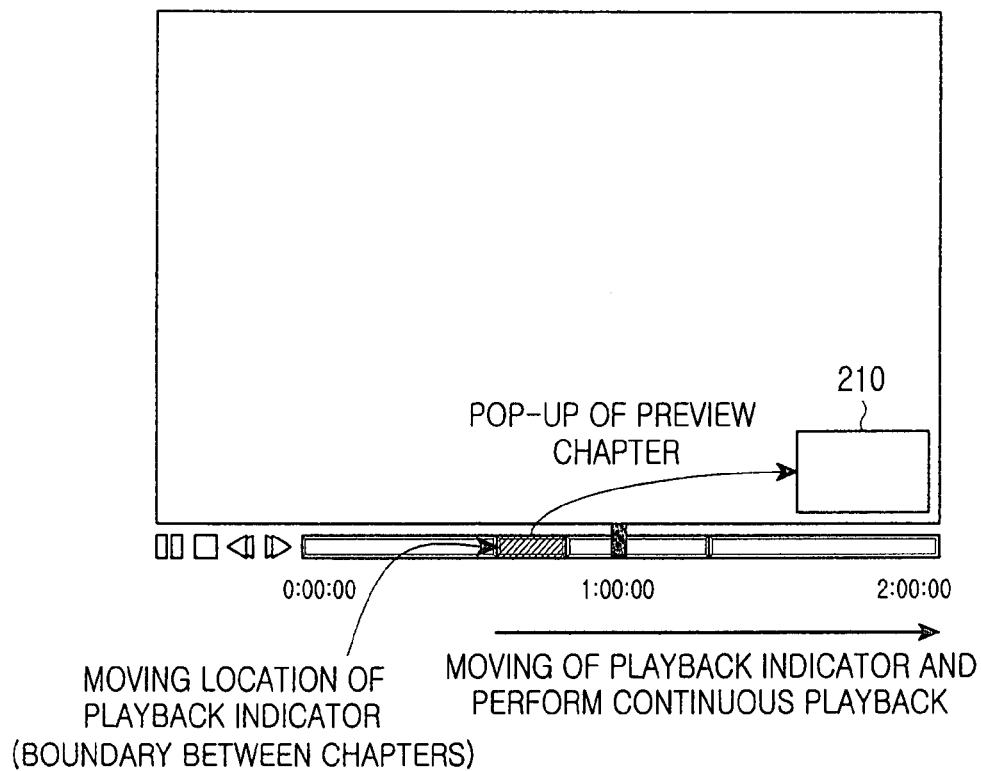
FIG. 5 illustrates a diagram of the playback of a chapter in the apparatus for providing additional information of media content according to an exemplary embodiment of the present invention.

FIG. 4 illustrates a default state of the apparatus for providing additional information of media content, according to an exemplary embodiment of the present invention, and FIG. 5 illustrates the playback of a chapter by the apparatus for providing additional information of media content, according to an exemplary embodiment of the present invention.

The playback indicator 190 of the smart progress bar 140 is defaulted when the media is played back for the first time. In step S330, as shown in FIG. 4, the media, which has been in the default state, is continuously played back over time by means of the playback control button 170. In such a state, no additional information is represented on the progress bar 180. Rather, like a conventional apparatus for providing additional information of media content, the media playback time can be controlled over time by moving the playback indicator 190 over the progress bar 180.

Referring to FIG. 5, together with FIG. 3, in step S340, the user changes a state of the playback indicator 190 in the default state illustrated in FIG. 4 into a chapter state by using the smart progress bar 140. In such a case, an additional information index, e.g., a chapter index, is displayed on the progress bar 180 and a preview pop-up area 210 is displayed in the media renderer window 135 for each chapter in step S350. According to a user setting, the preview pop-up area 210 may be displayed all the time or selectively displayed when the user selects a particular section of content in a pop-up manner.

The playback indicator 190 moves on the progress bar 180 by chapter. The user can easily change a media playback time into a desired particular chapter by moving the playback indicator 190. That is to say, in a case where the playback indicator 190 is in the chapter state (e.g., in state in which a selection of a preview chapter is activated), the playback indicator 190 can be moved quickly to a desired chapter of media, which has been in a default state, and is played back and a next chapter is continuously played back immediately after the playback of the preview chapter, in step S360.

Figure 6:
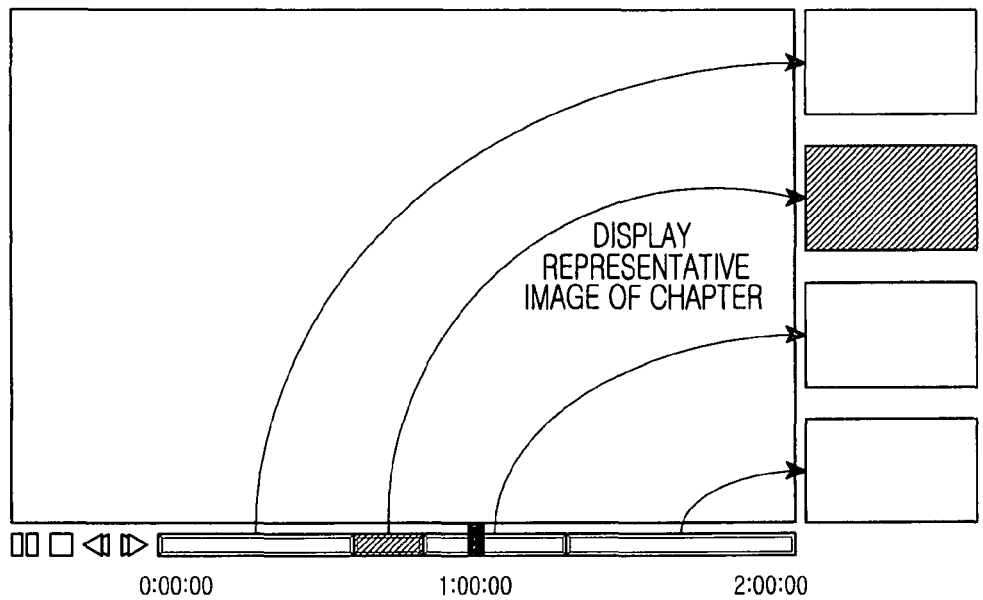
FIG. 6 illustrates a diagram of an example of an additional information renderer according to an exemplary embodiment of the present invention.

FIG. 6 illustrates an example of an additional information renderer according to an exemplary embodiment of the present invention. As illustrated in FIG. 6, together with FIG. 3, if the additional information renderer window 160 is set to be selectively displayed according to a user setting in step S370, the apparatus 100 displays representative images of the respective chapter sections, one of a small-capacity moving image and summary as well as the chapter index and the chapter section in the additional information renderer window 160 in step S380. However, these items are displayed in the additional information renderer window 160 only when the user inputs a setting such that the additional information renderer window 160 is displayed according to the user setting for each chapter section.

Figure 7:
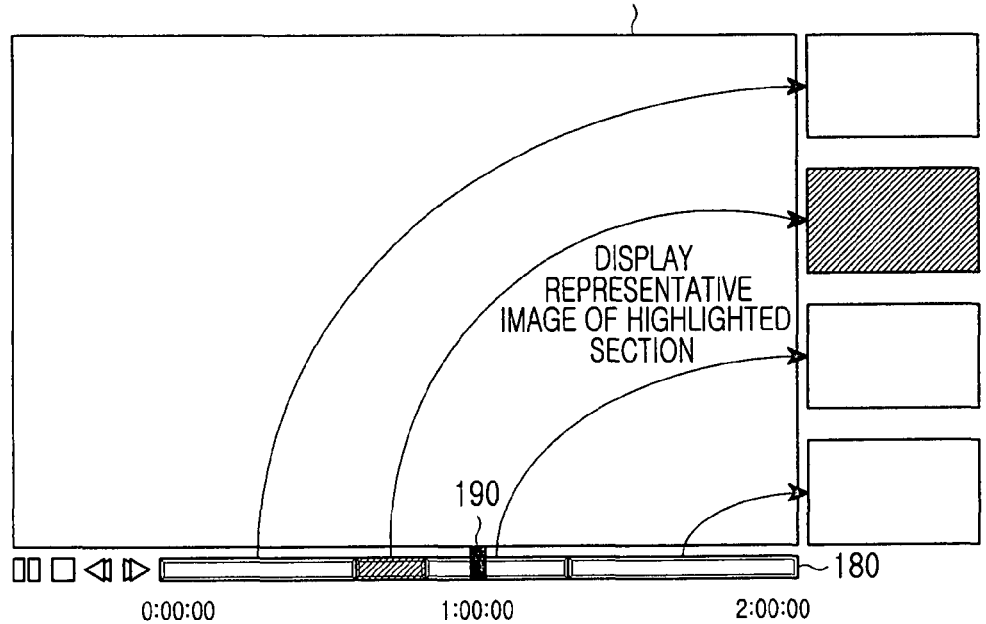
FIG. 7 illustrates a diagram of the playback of highlighted information in an apparatus for providing additional information of media content according to another exemplary embodiment of the present invention.
Figure 8:
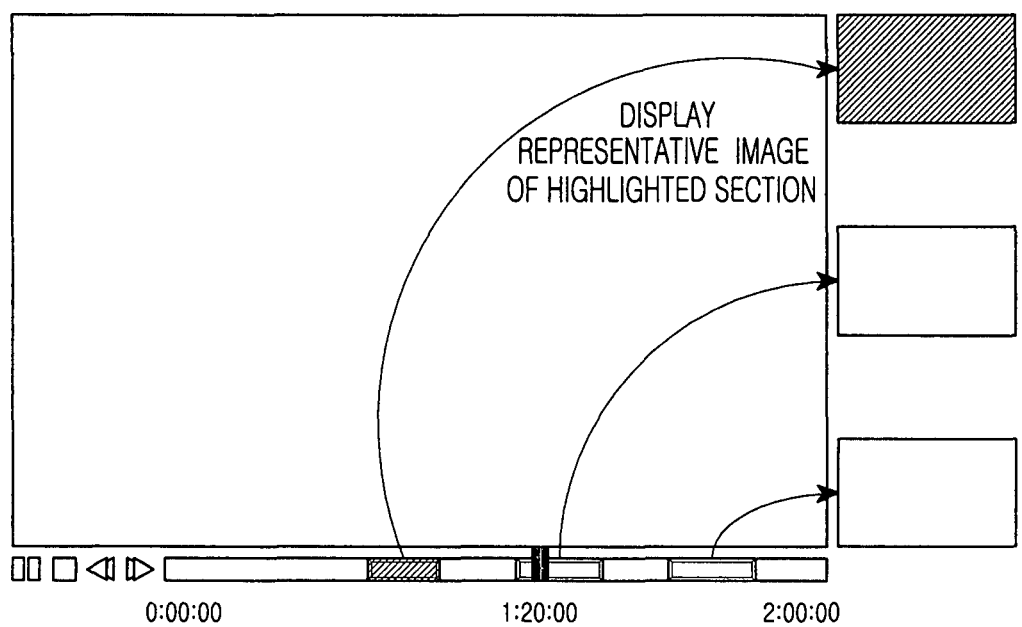
FIG. 8 illustrates a diagram illustrating an example of an additional information renderer according to another exemplary embodiment of the present invention.

FIG. 7 illustrates the playback of highlighted information in an apparatus for providing additional information of media content according to another exemplary embodiment of the present invention, and FIG. 8 illustrates an example of an additional information renderer according to a further exemplary embodiment of the present invention.

Referring to FIGS. 7 and 8, in a case where the user changes a state of a playback indicator 190 into a highlighted state, a highlighted section is displayed on a progress bar 180 and a preview pop-up area 210 is displayed in the media renderer window 135.

The playback indicator 190 can move quickly on the progress bar 180 by highlighted section. In such a case, a playback method may vary. That is to say, immediately after playing back one highlighted section, the apparatus 100 for providing additional information of media content according to the present invention moves to a next highlighted section for continuous playback. The played-back section(s) can be displayed at any time when the user desires to display the same.

As described above, according to the present invention, additional information related to digital contents can be displayed in various ways under user optional control and can be displayed during the playback of media content, thereby maximally rendering characteristic features of media content and ultimately making the media content become higher value-added products.

In addition, since the additional information related to media content is compiled or searched for at a user desired time, management of the additional information is facilitated. Further, updated additional information can be provided in various ways according to a user setting.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for providing additional information of media content in digital contents management, the apparatus comprising:
    a media source to receive media and additional information from at least one of a local file, a portable storage medium and a network and to transfer the received media and additional information into the apparatus;
    a media renderer operationally connected to the media source to render to a user the received and transferred media in a displayed main renderer window having a display region within window borders of the main renderer window, to render additional information in an additional information renderer window displayed external to the window borders of the main renderer window, and to render a smart progress bar outside the main renderer window;
    an additional information analyzer operationally connected to the media source and the media renderer to analyze the received and transferred additional information and output analyzed received and transferred additional information to the media renderer;
    the smart progress bar being operationally connected to the media renderer to control displaying of a portion of the additional information selected by the user from the received and transferred additional information, and to control a playback of the received and transferred media on the main renderer window based on the output analyzed received and transferred additional information; and
    an additional information renderer operationally connected to the smart progress bar and the additional information analyzer to display, in a preview pop-up area in the main renderer window, the user-selected portion of the received and transferred additional information in the smart progress bar to the user by controlling the smart progress bar;
    wherein the additional information window displays additional information comprising summary information or a representative image of the media contents corresponding to a highlighted segment of the progress bar.

2. The apparatus of claim 1, wherein the smart progress bar controls the media renderer to playback the received and transferred media and controls the additional information renderer to display the received and transferred additional information.

3. The apparatus of claim 1, wherein the additional information renderer displays the additional information displayed in the additional information window one of all the time and selectively according to a user setting; and
    a vertical position of the additional information window correlates to a sequence position in the received media of the highlighted portion of the progress bar.

4. The apparatus of claim 2, wherein the smart progress bar further comprises:
    a playback control button to control the playback of the received and transferred media;
    a progress bar to display an index of the received and transferred additional information;
    a playback indicator to indicate a current playback time of the received and transferred media and to move a media playback time to a desired user time; and
    a time mark configured to indicate a start time and an end time of the received and transferred media, and a current playback time.

5. The apparatus of claim 4, wherein the smart progress bar controls the media renderer to display the preview pop-up area in which the received and transferred additional information is previewed by means of a playback indicator as set by the user.

6. The apparatus of claim 5, wherein the playback indicator moves the index of the additional information by a section as set by the user.

7. The apparatus of claim 1, wherein the additional information includes at least one of at least one chapter information, highlighted information, and a representative image for each chapter of said at least one chapter information.

8. The apparatus of claim 6, wherein the additional information includes at least one of at least one chapter information, highlighted information, and a representative image for each chapter of said at least one chapter information.

9. A method for providing on a display additional information of media content in digital contents management, the method comprising the steps of:
    receiving media and additional information from at least one of a local file, a portable storage medium and a network;

transferring the received media and additional information into an apparatus;

displaying the received and transferred media in a main window having a display region within window borders of the main window;

analyzing the received and transferred additional information;

setting the additional information to be displayed on the display in an additional information renderer window displayed external to the window borders of the main window of the display one of all the time and selectively according to a user setting;

displaying a smart progress bar external to the main window;

establishing a default state of a playback indicator for displaying the additional information, to cause said apparatus to continuously playback during the default state the received and transferred media in the main window of the display;

changing a state of the playback indicator away from the default state based on the received and transferred additional information;

receiving a user selection of a portion of the additional information from the received and transferred additional information;

displaying the smart progress bar which includes displaying the user-selected portion of the additional information;

displaying an index of the received and transferred additional information in the additional information renderer window of the display that is external to the main window of the display and a preview pop-up area that is internal to the main window of the display;

selecting for playing back in the main window of the display the preview pop-up by moving the playback indicator; and displaying, in the preview pop-up window, the user-selected portion of the received and transferred additional information in the smart progress bar; and displaying, in the additional information window, additional information comprising summary information or a representative image of the media contents corresponding to a highlighted segment of the progress bar.

10. The method of claim 9, wherein the step of setting the additional information further comprises selectively displaying the additional information according to the user setting, and a vertical position of the additional information window correlates to a sequence position in the received media of the highlighted portion of the progress bar.

11. The method of claim 9, wherein the step of selecting for playing back further comprises playing back the preview pop-up by moving the index of the additional information by section as set by the user.

12. The method of claim 9, wherein the additional information includes at least one of at least one chapter information, highlighted information, and a representative image for each at least one chapter information.

13. The method of claim 10, wherein the additional information includes at least one of at least one chapter information, highlighted information, and a representative image for each at least one chapter information.

14. The method of claim 11, wherein the additional information includes at least one of at least one chapter information, highlighted information, and a representative image for each at least one chapter information.

15. A method for providing additional information of media content in digital contents management, the method comprising the steps of:

receiving, at a media source, media and additional information from at least one of a local file, a portable storage medium and a network;

transferring the received media and additional information into an apparatus;

rendering, to a user in a main renderer window having a display region within window borders of the main renderer window, the receiving and transferred media using a media renderer operationally connected to the media;

rendering the additional information in an additional information renderer window displayed external to the window borders of the main renderer window;

rendering a smart progress bar external to the main renderer window;

analyzing the received and transferred additional information using an additional information analyzer operationally connected to the media source;

outputting the analyzed received and transferred additional information to the main renderer;

receiving a user selection of a portion of the additional information from the received and transferred additional information;

displaying the smart progress bar operationally connected to the media renderer, the smart progress bar being used to control a playback of the received and transferred media on the main renderer window based on the output analyzed received and transferred additional information; and displaying to the user, as a preview pop-up area in the main renderer window, the user-selected portion of the received and transferred additional information in the smart progress using an additional information renderer operationally connected to the smart progress bar and the additional information analyzer by controlling the smart progress bar; and displaying, in the additional information window, additional information comprising summary information or a representative image of the media contents corresponding to a highlighted segment of the progress bar.

16. The method of claim 15, wherein the smart progress bar controls the media renderer to playback the received and transferred media and controls the additional information renderer to display the received and transferred additional information.

17. The method of claim 15, wherein the additional information renderer displays the additional information one of all the time and selectively according to a user setting; and a vertical position of the additional information window correlates to a sequence position in the received media of the highlighted portion of the progress bar.

18. The method of claim 16, wherein the smart progress bar further comprises:

a playback control button to control the playback of the received and transferred media;

a progress bar to display an index of the received and transferred additional information;

a playback indicator to indicate a current playback time of the received and transferred media and to move a media playback time to a desired user time; and a time mark configured to indicate a start time and an end time of the received and transferred media, and a current playback time.

19. The method of claim 18, wherein the smart progress bar controls the media renderer to display the preview pop-up area in which the received and transferred additional information is previewed by means of a playback indicator as set by the user.

20. The method of claim 19, wherein the playback indicator moves the index of the additional information by a section as set by the user.

\* \* \* \* \*

UNITED STATES PATENT AND TRADEMARK OFFICE
CERTIFICATE OF CORRECTION

| | | |
|---|---|---|
| PATENT NO. | : 8,799,950 B2 | Page 1 of 1 |
| APPLICATION NO. | : 11/977219 | |
| DATED | : August 5, 2014 | |
| INVENTOR(S) | : Sung-Jin Park et al. | |

It is certified that error appears in the above-identified patent and that said Letters Patent is hereby corrected as shown below:

In the Claims

Column 6, Claim 1, Line 1 should read as follows:
--...and output the analyzed...--

Signed and Sealed this
Fourteenth Day of October, 2014

Michelle K. Lee
*Deputy Director of the United States Patent and Trademark Office*